United States Patent
Knope et al.

(10) Patent No.: US 10,981,667 B2
(45) Date of Patent: Apr. 20, 2021

(54) UNIFORM GENERATOR CONTROL UNIT INCLUDING MULTIPLE PERMANENT MAGNET GENERATOR INPUTS

(71) Applicant: Hamilton Sundstrand Corporation, Charlotte, NC (US)

(72) Inventors: Daniel Knope, Rockton, IL (US); Christopher Derek Thornton, Saint Charles, IL (US); Richard T. Wetzel, Davis Junction, IL (US); Christopher Gillette, Windsor Locks, CT (US); Benjamin Fisher, Rockford, IL (US); Timothy Arn Goodrich, Rockford, IL (US); Adrian E. Vandergrift, Rockton, IL (US); Dana A. Sievert, Byron, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 373 days.

(21) Appl. No.: 15/982,454

(22) Filed: May 17, 2018

(65) Prior Publication Data
US 2019/0352017 A1    Nov. 21, 2019

(51) Int. Cl.
*B64D 41/00*    (2006.01)
*B64D 31/00*    (2006.01)
*H02J 3/46*    (2006.01)

(52) U.S. Cl.
CPC .............. *B64D 41/00* (2013.01); *B64D 31/00* (2013.01); *B64D 2221/00* (2013.01); *H02J 3/46* (2013.01)

(58) Field of Classification Search
CPC ............ H02M 1/10; H02M 5/00; H02M 5/10; H02M 5/12; H02M 5/458; H02M 7/00; H02M 7/06; H02M 7/08; B64D 33/00; B64D 41/00; B64D 31/00; H02P 5/00; H02P 5/74; H02P 9/00; H02P 9/02; H02P 9/024; H02P 9/0241; H02P 9/48; H02P 9/38; H02P 9/302; H02P 13/00; H02P 13/06; H02J 3/00; H02J 3/38; H02J 3/46
See application file for complete search history.

(56) References Cited

U.S. PATENT DOCUMENTS

| | | | | |
|---|---|---|---|---|
| 4,968,926 | A * | 11/1990 | Dhyanchand | F02N 11/04 290/38 R |
| 5,804,953 | A * | 9/1998 | Bowyer | H02M 1/10 323/256 |
| 8,687,394 | B2 | 4/2014 | Berliner et al. | |
| 2001/0048356 | A1 | 12/2001 | Owen | |

(Continued)

FOREIGN PATENT DOCUMENTS

| EP | 3168950 | 5/2017 |
|---|---|---|
| EP | 3188335 | 7/2017 |

OTHER PUBLICATIONS

European Search Report for EP Application No. 19174682.5 dated Aug. 22, 2019.

*Primary Examiner* — Tran N Nguyen
(74) *Attorney, Agent, or Firm* — Carlson, Gaskey & Olds, P.C.

(57) ABSTRACT

A generator control unit includes a plurality of permanent magnet generator (PMG) inputs, a transformer including a multi-configuration input winding and at least one output winding. Each PMG input in the plurality of PMG inputs is connected to the multi-configuration input winding at a corresponding input winding input.

22 Claims, 4 Drawing Sheets

(56) References Cited

U.S. PATENT DOCUMENTS

| | | | |
|---|---|---|---|
| 2012/0306402 A1* | 12/2012 | Csikszentimrei | H05B 41/42 |
| | | | 315/282 |
| 2013/0310994 A1* | 11/2013 | Schroeter | H02J 4/00 |
| | | | 700/287 |
| 2014/0197681 A1* | 7/2014 | Iwashima | H02J 3/32 |
| | | | 307/9.1 |
| 2017/0137143 A1 | 5/2017 | Demelas | |
| 2017/0359011 A1 | 12/2017 | Rozman et al. | |

* cited by examiner

UNIFORM GENERATOR CONTROL UNIT INCLUDING MULTIPLE PERMANENT MAGNET GENERATOR INPUTS

TECHNICAL FIELD

The present disclosure relates generally to aircraft generator control units, and more specifically to aircraft generator control units including multiple permanent magnet generator inputs and a single power output.

BACKGROUND

Commercial and military aircraft often include onboard electrical systems such as control computers, passenger environmental systems, and the like. In order to power the electrical systems, generators are included throughout the aircraft and utilize rotational inputs from corresponding aircraft components to generate electrical power. Each of the generators includes an internal permanent magnet generator that provides internal operational power to the generator control unit and to the generator.

The different permanent magnet generators used throughout the aircraft can include varied voltage and current outputs, and can require distinct generator control unit (GCU) internal transformer configurations to provide the correct control power to the corresponding generator. Existing aircraft usually achieve this normalization by either including a distinct generator control unit for each generator, or including a dedicated transformer for each permanent magnet generator within every generator control unit. As can be appreciated, the inclusion of multiple distinct generator control units increases system complexity and the inclusion of multiple distinct transformers within each generator control unit increases the weight carried by the aircraft.

SUMMARY OF THE INVENTION

In one exemplary embodiment a generator control unit includes a plurality of permanent magnet generator (PMG) inputs, a transformer including a multi-configuration input winding and at least one output winding, each PMG input in the plurality of PMG inputs being connected to the multi-configuration input winding at a corresponding input winding input.

In another example of the above described generator control unit the multi-configuration input winding is a multi-tapped primary winding having a plurality of phase legs.

In another example of any of the above described generator control units the multi-configuration input winding is a multiple isolated series winding.

In another example of any of the above described generator control units the multi-configuration input winding includes a plurality of parallel primary windings, each of the parallel primary windings having a distinct parallel primary winding configuration.

In another example of any of the above described generator control units the distinct parallel primary winding configuration includes a distinct number of winding turns from each other parallel primary winding.

In another example of any of the above described generator control units each of the parallel winding configurations corresponds to at least one PMG input in the plurality of PMG inputs.

In another example of any of the above described generator control units the at least one output winding includes a single output winding.

In another example of any of the above described generator control units the at least one output winding includes a plurality of output windings.

In another example of any of the above described generator control units the multi-configuration input winding includes a plurality of phase legs, with each phase leg comprising an identical number of isolated (floating) windings.

In another example of any of the above described generator control units a configuration of the isolated (floating) windings in each phase is actively controlled.

In another example of any of the above described generator control units a configuration of the isolated (floating) windings in each phase is wired external to the multi-configuration input winding.

In one exemplary embodiment an aircraft electrical system includes a plurality of generators, each of the generators including a corresponding permanent magnet generator (PMG) and a corresponding uniform generator control unit, and being connected to a power distribution system, and each uniform generator control unit being identical to each other uniform generator control unit and including a transformer having a multi-configuration input winding and at least one output winding, wherein each PMG is connected to a single configuration of the corresponding multi-configuration input winding.

In another example of the above described aircraft electrical system the multi-configuration input winding is a single winding having a plurality of phase legs, with each phase leg including a plurality of input taps.

In another example of any of the above described aircraft electrical systems the multi-configuration input winding is a multiple isolated series winding.

In another example of any of the above described aircraft electrical systems at least two of the PMGs are connected to a corresponding first input tap in the plurality of input taps of the corresponding generator control unit in a first configuration, and wherein at least one other of the PMGs in the plurality of PMGs is connected to the corresponding first input tap in the corresponding generator control unit in a second configuration.

In another example of any of the above described aircraft electrical systems the multi-configuration input winding is a plurality of parallel input windings, and wherein each input winding in the plurality of parallel input windings has a distinct number of turns per leg.

In another example of any of the above described aircraft electrical systems at least one of the parallel input windings in the plurality of parallel input windings is a multi-tapped input winding.

In another example of any of the above described aircraft electrical systems each uniform generator control unit includes a number of inputs, and the number of inputs is less than the number of permanent magnet generators including the uniform generator control units.

An exemplary method for standardizing aircraft components includes providing a uniform generator control unit to each generator on an aircraft, the uniform generator control unit including a plurality of permanent magnet generator (PMG) inputs, a transformer including a multi-configuration input winding and at least one output winding, and each PMG input in the plurality of PMG inputs being connected to the multi-configuration input winding at a corresponding input winding input, and passing power from a PMG through a corresponding configuration of the multi-configuration transformer, thereby generating operational power for the corresponding generator control unit and the corresponding generator.

In another example of the above described method for standardizing aircraft components passing power through the corresponding configuration of the multi-configuration transformer comprises passing power from the PMG corresponding through a distinct parallel input winding of the multi-configuration transformer.

In another example of any of the above described methods for standardizing aircraft components passing power through the corresponding configuration of the multi-configuration transformer comprises passing power from the permanent magnet generator in the plurality of PMGs to a distinct input tap at each phase leg of the single transformer.

These and other features of the present invention can be best understood from the following specification and drawings, the following of which is a brief description.

DETAILED DESCRIPTION

Figure 1:
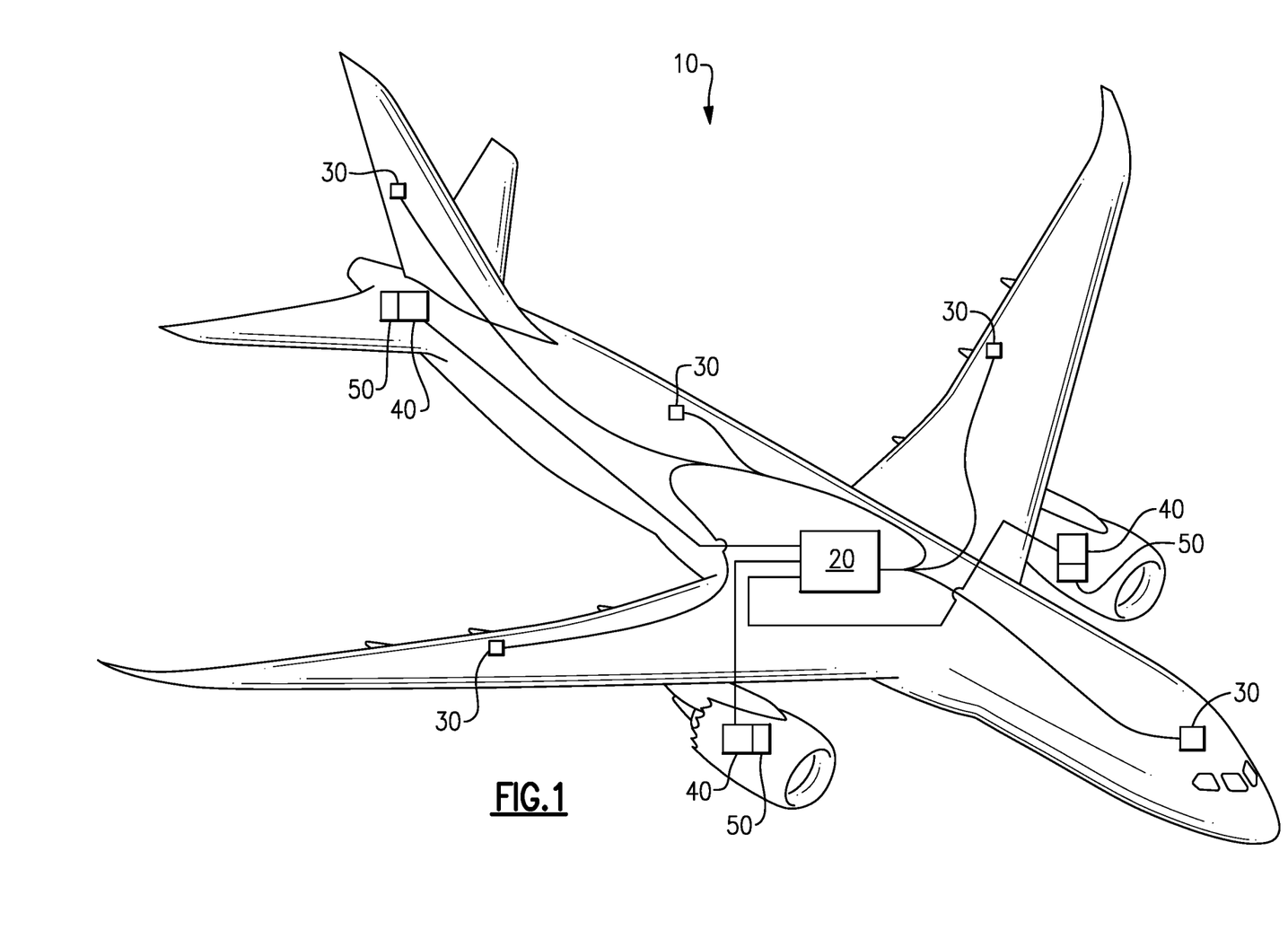
FIG. 1 schematically illustrates an exemplary aircraft including a power distribution system.

FIG. 1 schematically illustrates an aircraft 10 including a power distribution system 20 for distributing electrical power to multiple onboard electrical systems 30. The electrical power is generated by multiple onboard generators 40, each of which includes an internal permanent magnet generator. While illustrated herein as including three generators 40, one of skill in the art will appreciate that the system described herein can be expanded to include any number of additional generators 40 without requiring substantial alterations to the disclosed system.

Each of the generators 40 receives rotational power from corresponding aircraft components, and has a unique internal permanent magnet generator construction dictated by its location within the aircraft 10 and the component driving the rotation of the generator 40. Output power generated by each generator 40 is provided to the power distribution system 20.

As a result of the distinct output power capabilities and operating requirements of each generator 40, each of the generators 40 includes a generator control unit 50. The generator control unit 50 draws internal control power from the corresponding permanent magnet generator, and regulates the output power provided by the generator 40 in order to ensure that the output power is within the range of power that can be distributed via the power distribution system 20. In some examples, the generator control unit 50 can further include a computerized component assisting the operation and control of the generator 40 including the generator control unit 50 according to any known generator control configuration.

In existing aircraft power generation systems, each permanent magnet generator has a distinct part number and a distinct generator control unit configuration due to the distinct power output capabilities of a given generator on the aircraft. However, it is common for the generator control units 50 to have a single part number, and utilize a single standardized configuration across all of the generators 40. When all of the permanent magnet generators have power capabilities within a reasonable range of the power capabilities of each other permanent magnet generator, utilizing a single internal transformer within the corresponding generator control units 50 for providing the internal power to the permanent magnet generator is an operable solution. However, in some cases the output voltage capabilities of the permanent magnet generators can be too far varied resulting in an aircraft 10 where a generator control unit 50 having a single internal transformer configuration cannot be utilized for all permanent magnet generators included within the generators 40.

Figure 2:
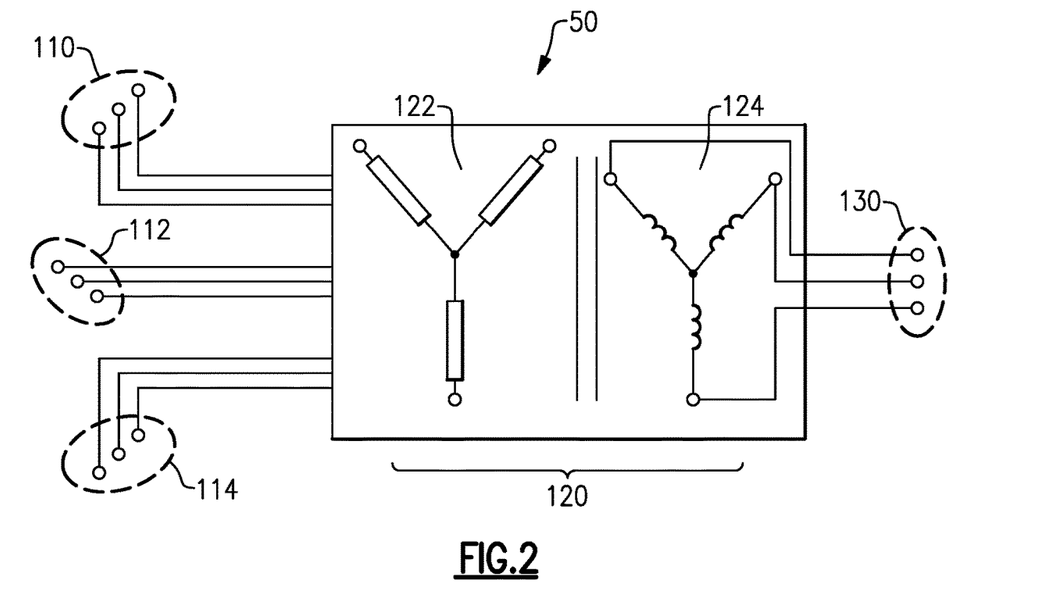
FIG. 2 schematically illustrates an exemplary generator control unit which could be used within the power distribution system of FIG. 1.

With continued reference to FIG. 1, and with like numerals indicating like elements, FIG. 2 schematically illustrates an exemplary generator control unit 50 that can be universally used in all of the generators 40, despite the extreme variation in power capabilities, according to one embodiment. The generator control unit 50 has multiple three phase inputs 110, 112, 114, with each input 110, 112, 114 corresponding to one or more permanent magnet generators on the aircraft 10. When multiple permanent magnet generators have the same characteristics (i.e. output power within the same voltage and current scale) a single input 110, 112, 114 corresponding to that specific power configuration can be provided. By way of example, if the permanent magnet generators within the generators 40 on each of the aircraft engines have the same power requirements, only a single generator control unit 50 input is required to cover that configuration.

Within the generator control unit 50 is a transformer 120. The exemplary transformer 120 includes a multi-configuration primary winding 122 paired with a single secondary winding 124. In alternative examples, multiple secondary windings 124 can be utilized according to any known transformer configuration. These windings 122, 124 can alternately be referred to as an input winding 122 and an output winding 124. The transformer 120 receives power from the corresponding permanent magnet generator at one of the inputs 110, 112, 114 and converts the received power into internal operating power based on the ratio of the turns in the primary winding 122 at the input 110, 112, 114, where the power is received, to the number of turns in the secondary winding(s) 124. The internal operating power for the generator control unit 50 is drawn from the corresponding permanent magnet generator, and allows for the regulation and control of the output power generated by the generator 40.

The generator output power is then provided to the power distribution system 20. The multiple configuration primary winding 122 includes multiple connections, each of which is configured to pass connected power through a corresponding number of turns. The number of turns at each input 110, 112, 114 is configured such that, when connected correctly, the connected permanent magnet generator causes the secondary winding(s) 124 to output power at a predefined internal operating voltage.

To achieve this, each input 110, 112, 114 is connected to a corresponding configuration of each phase leg of the primary winding 122. The multi configuration nature of the primary winding 122 allows a single primary winding 122 structure to receive input power at different voltage and current levels, and transform the power to a corresponding desired internal operating power through the single secondary winding 124. In this way, identical generator control units 50 can be used throughout all of the generators 40 by connecting each generator control unit 50 to its corresponding permanent magnet generator via the correct inputs 110, 112, 114.

Figure 3:
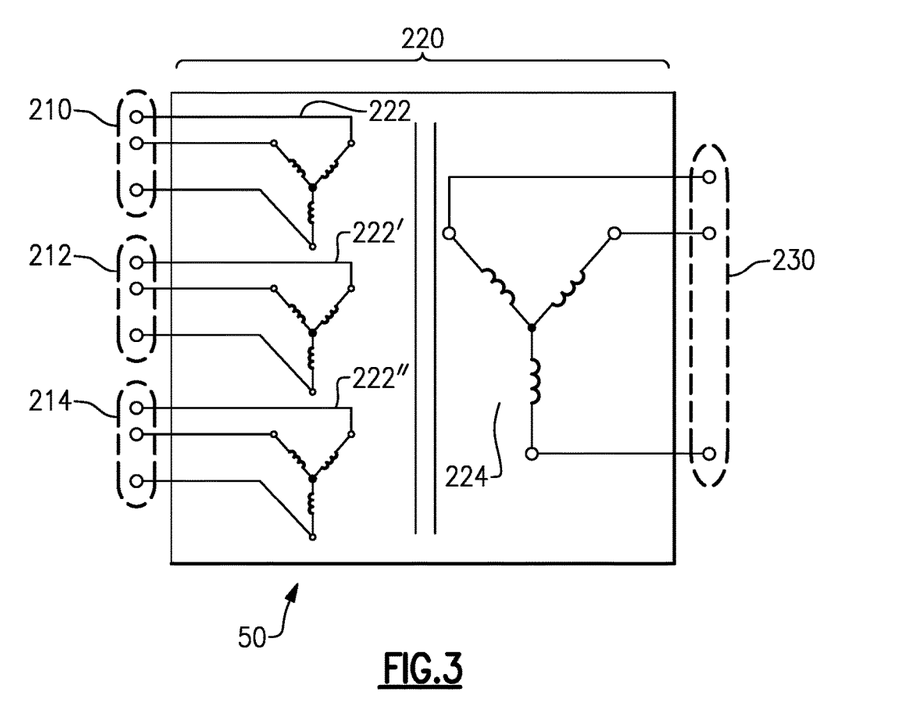
FIG. 3 schematically illustrates a first exemplary configuration of the generator control unit of FIG. 2.

In some examples, such as the example illustrated in FIG. 3, the multi configurations are achieved via the use of multiple parallel primary windings, each paired with the secondary winding(s) 124 and each having a distinct number of winding turns. In alternative examples, a single primary winding 122 with multiple taps can be utilized, as in the example of FIG. 4. In the alternative example, each tap corresponds to a distinct number of turns on a given phase leg.

With continued reference to FIGS. 1 and 2, and with like numerals indicating like elements, FIG. 3 schematically illustrates an exemplary generator control unit 50 including a transformer 220 having three parallel primary windings 222, 222', 222" and a single secondary winding 224. Each of the parallel primary windings 222, 222', 222" is connected to one of the permanent magnet generator inputs 210, 212, 214 and includes three phase legs.

Each of the phase legs has a set number of turns, corresponding to the transformation ratio required at the given input 210, 212, 214. When included in the generator 40, the power from the internal permanent magnet generator is connected to the input 210, 212, 214 that corresponds to the correct transformer output based on the number of turns in the connected parallel primary winding 222, 222', 222". In some examples, multiple identical, or approximately identical, permanent magnet generators can be included within the generators 40. In such examples a single parallel primary winding 222, 222', 222" connected to a single input 210, 212, 214 can be designated for that permanent magnet generator configuration, and there can be less configurations included than the total number of permanent magnet generators.

The secondary winding 224 includes a single three phase output 230 which provides internal operating power the generator control unit 50.

With continued reference to FIGS. 1-3, FIG. 4 schematically illustrates another example generator control unit 50. As with the generator control unit 50 illustrated in FIG. 3, the generator control unit 50 of FIG. 4 includes a single secondary winding 324 that outputs three phases A, B, C to provide internal power to the generator control unit 50 and allow for the generator control unit 50 to regulate the corresponding generator 40. The multi-configuration primary winding 322 is a single multi-tap winding 322. As used herein a multi-tap winding is an electrical winding with input connections at multiple points in the winding. The position of the tap on the phase leg determines how many turns of the primary winding 322 the power connected to that tap is passed through.

As is understood in the art, the ratio between the number of turns of the input winding that the power is passed through to the total number of turns on the output winding determines the scale of the power at the outputs A, B, C. In the illustrated example, each leg of the multi-tap winding 322 includes three inputs 362, 364, 366 (illustrated on only a single leg for clarity) corresponding to three distinct permanent magnet generator configurations that can correspond to the generator control unit 50. In the illustrated example, the innermost tap 362 passes the power through the least amount of turns, the middle tap 364 passes the power through an intermediate number of turns, while the outermost tap 366 passes the power through all of the turns. In yet a further variation of the example of FIG. 4, each segment A1, A2, A3, etc. of a given phase leg can be independent of each other segment. In such a configuration the segments can be jumped together at the corresponding inputs according to known jumping techniques allowing for one or more of the segments to be omitted. Such a configuration further expands on the number of configurations a given input winding 322 can include, and is referred to as a multiple isolated series winding.

Figure 4:
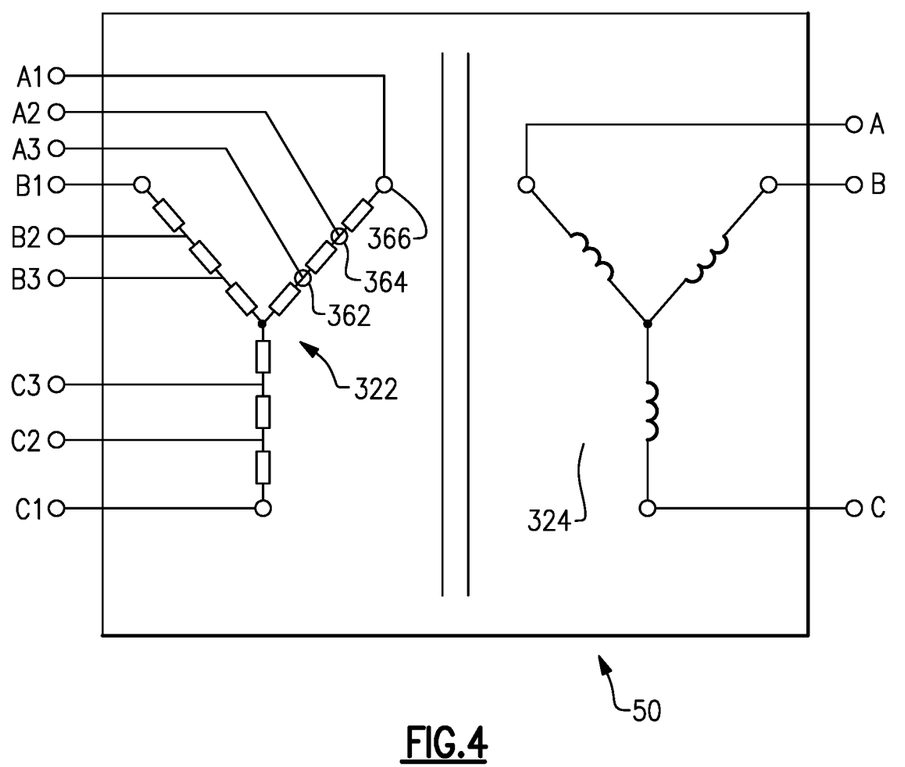
FIG. 4 schematically illustrates a second exemplary configuration of the generator control unit of FIG. 2.

Each of the inputs 362, 364, 366 is at the same position on each leg of the primary winding 3222, resulting in inputs at effectively three distinct turn ratios seen by the single secondary winding 324. The number of taps 362, 364, 366, and the specific number of turns at each tap can be adjusted depending on the specific needs of each of the permanent magnet generators 40 that could include the generator control unit 50.

By utilizing a single multi-tapped input winding within the generator control unit 50, the weight of each generator control unit 50, and thus the overall weight of the aircraft 10, can be reduced relative to previous examples. Further, when constructed with a standard set of known taps 362, 364, 366, the generator control unit 50 of FIG. 4 can be utilized in an "off the shelf" capacity, with a single generator control unit configuration being able to generate internal operating power using the generator control unit's 50 permanent magnet generator while installed in any given generator 40 within the aircraft 10.

In yet a further example, the structures of FIG. 3 and FIG. 4 can be combined, and one or more of the parallel primary windings 222, 222', 222" can be a multi-tap winding, such as the multi-tap winding 322 illustrated in FIG. 4. Such a configuration further can achieve some of the weight reduction benefits of the multi-tap configuration of FIG. 4, while at the same time achieving some of the flexibility of the parallel winding configuration of FIG. 3.

With continued reference to FIGS. 1-4, FIG. 5 schematically illustrates another specific exemplary generator control unit 50 including a transformer having a primary winding 422 corresponding to three secondary windings 424', 424", 424''' (referred to collectively as secondary windings 424). While illustrated as windings in a wye configuration (secondary winding 424'), a delta winding (424") and a single winding (424''') one of skill in the art will appreciate that the windings can be any combination of the types including all one type of winding, a combination of two types of windings, or a combination of all three types of windings.

The illustrated primary winding 422 includes three phase legs 470, each of which includes three isolated (floating) windings 472. In alternative examples two isolated (floating) windings 472, or any number greater than three can be utilized in place of the illustrated three isolated (floating) windings 472. Each of the isolated (floating) windings 472 includes a first tap 474 and a second tap 476. The second tap 476 of one of the isolated (floating) windings 472 in each leg 470 is connected to a center point of the wye configuration, and the isolated (floating) winding 472 including center point tap 476 is always included in the transformer configuration. Each of the other isolated (floating) windings 472 in a given leg 470 can be connected, or disconnected, by connecting a second tap 476 of one isolated (floating) winding 472 to a first tap of the another isolated (floating) winding 472 in series, as illustrated via connectors 478 in FIG. 5.

Figure 5:
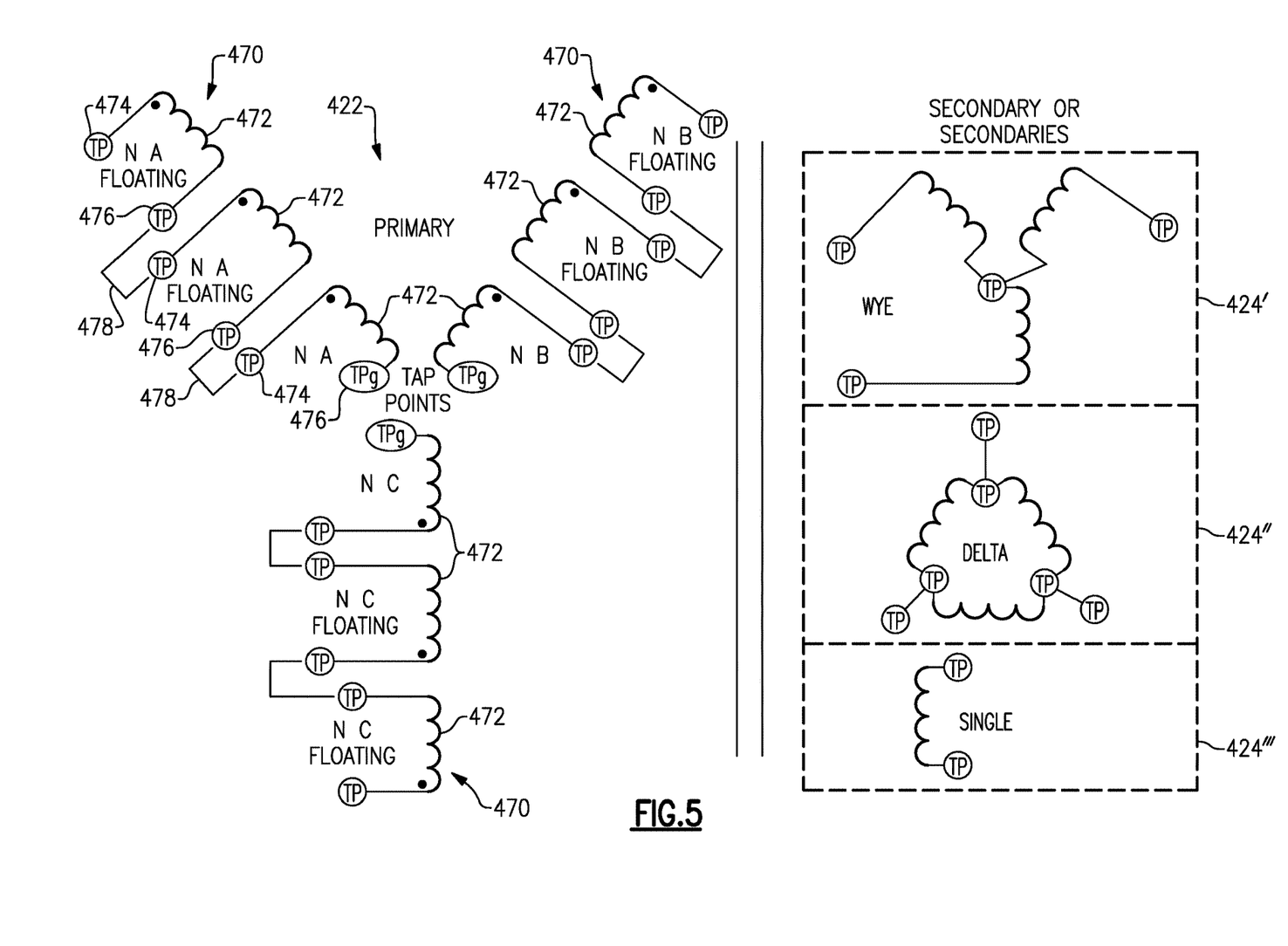
FIG. 5 schematically illustrates another exemplary generator control unit including a transformer having a primary winding corresponding to three secondary windings.

The connectors 478 are, in some examples, permanent or semi-permanent jumpers connected during an installation of the generator control unit 50. The connectors 478 are, in other examples, controlled switches that are controlled via the generator control unit 50. When controlled switches are utilized, active control of the transformer within the generator control unit 50 can be utilized to accommodate different operational modes (e.g. different rotational speeds) of the permanent magnet generator and further ensure a net zero flux impact to the core.

Utilization of multiple isolated (floating) windings 472 in the primary winding 422 reduces parasitic capacitance and inductances that can be further compounded by the coupling of out-of-phase voltages from the other input phases. Such parasitic capacitance and inductance can result in harmonic noise, higher voltages, including higher voltage transients, or sub harmonics that can excite mechanical resonance.

While each of the generator control units 50 illustrated herein includes a schematic permanent magnet generator control unit transformer, one of skill in the art will appreciate that the generator control units include all other conventional generator control unit circuitry. The conventional aspects of the generator control unit 50 are omitted from the illustration and discussion in the interest of brevity and clarity.

While illustrated in the provided examples as three distinct three-phase permanent magnet generator connections to the generator control unit, one of skill in the art will appreciate that any balanced number of phases could be included in each of the permanent magnet generators, and any number permanent magnet generator configurations could be used with minimal alterations to the illustrated configuration.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A generator control unit comprising:
   a plurality of permanent magnet generator (PMG) inputs;
   a transformer including a multi-configuration input winding and at least one output winding, the multi-configuration input winding including a plurality of parallel primary windings, each of the parallel primary windings having a distinct parallel primary winding configuration;
   each PMG input in the plurality of PMG inputs being connected to the multi-configuration input winding at a corresponding input of the input winding.

2. The generator control unit of claim 1, wherein the multi-configuration input winding is a multi-tapped primary winding having a plurality of phase legs.

3. The generator control unit of claim 1, wherein the multi-configuration input winding is a multiple isolated series winding.

4. The generator control unit of claim 1, wherein the distinct parallel primary winding configuration includes a distinct number of winding turns from each other parallel primary winding.

5. The generator control unit of claim 4, wherein each of the parallel winding configurations corresponds to at least one PMG input in the plurality of PMG inputs.

6. The generator control unit of claim 1, wherein the at least one output winding includes a single output winding.

7. The generator control unit of claim 1, wherein the at least one output winding includes a plurality of output windings.

8. The generator control unit of claim 1, wherein the multi-configuration input winding includes a plurality of phase legs, with each phase leg comprising an identical number of isolated (floating) windings.

9. The generator control unit of claim 8, wherein a configuration of the isolated (floating) windings in each phase is actively controlled.

10. The generator control unit of claim 8, wherein a configuration of the isolated (floating) windings in each phase is wired external to the multi-configuration input winding.

11. An aircraft electrical system comprising:
    a plurality of generators, each of said generators including a corresponding permanent magnet generator (PMG) and a corresponding uniform generator control unit, and being connected to a power distribution system; and
    each uniform generator control unit being identical to each other uniform generator control unit and including a transformer having a multi-configuration input winding and at least one output winding, the multi-configuration input winding including a plurality of parallel input windings, and wherein each input winding in the plurality of parallel input windings has a distinct number of turns per leg, and wherein each PMG is connected to a single configuration of the corresponding multi-configuration input winding.

12. The aircraft electrical system of claim 11, wherein the multi-configuration input winding is a single winding having a plurality of phase legs, with each phase leg including a plurality of input taps.

13. The aircraft electrical system of claim 12, wherein the multi-configuration input winding is a multiple isolated series winding.

14. The aircraft electrical system of claim 12 wherein at least two of the PMGs are connected to a corresponding first input tap in the plurality of input taps of the corresponding generator control unit in a first configuration, and wherein at least one other of the PMGs in the plurality of PMGs is connected to the corresponding first input tap in the corresponding generator control unit in a second configuration.

15. The aircraft electrical system of claim 11, wherein at least one of the parallel input windings in the plurality of parallel input windings is a multi-tapped input winding.

16. The aircraft electrical system of claim 11, wherein each uniform generator control unit includes a number of inputs, and the number of inputs is less than the number of permanent magnet generators including the uniform generator control units.

17. A method for standardizing aircraft components comprising:
    providing a uniform generator control unit to each generator on an aircraft, the uniform generator control unit including a plurality of permanent magnet generator (PMG) inputs, a transformer including a multi-configuration input winding and at least one output winding, the multi-configuration input winding including a plurality of parallel primary windings, each of the parallel primary windings having a distinct parallel primary winding configuration and each PMG input in the plurality of PMG inputs being connected to the multi-configuration input winding at a corresponding input of the input winding; and passing power from a PMG through a corresponding configuration of the multi-configuration transformer, thereby generating operational power for the corresponding generator control unit and the corresponding generator.

18. The method of claim 17, wherein passing power through the corresponding configuration of the multi-configuration transformer comprises passing power from the PMG corresponding through a distinct parallel input winding of the multi-configuration transformer.

19. The method of claim 17, wherein passing power through the corresponding configuration of the multi-configuration transformer comprises passing power from the permanent magnet generator in the plurality of PMGs to a distinct input tap at each phase leg of the single transformer.

20. The generator control unit of claim 1, wherein the plurality of parallel primary windings includes a first primary winding having a first number of turns and a second primary winding having a second number of turns, the second number of turns being distinct from the first number of turns.

21. The generator control unit of claim 20, wherein the plurality of parallel primary windings further includes third primary winding having a third number of turns, the third number of turns being distinct from the first number of turns and the second number of turns.

22. The generator control unit of claim 20, wherein the plurality of parallel primary windings further includes third primary winding having a third number of turns, the third number of turns being the same as the first number of turns.

* * * * *